Jan. 7, 1964  I. H. SUBLETTE  3,117,308
CONTROL SYSTEMS
Filed July 1, 1957  2 Sheets-Sheet 1

INVENTOR.
IVAN H. SUBLETTE
BY Morris Liebman
ATTORNEY

Jan. 7, 1964     I. H. SUBLETTE     3,117,308

CONTROL SYSTEMS

Filed July 1, 1957     2 Sheets-Sheet 2

INVENTOR.
IVAN H. SUBLETTE
BY
ATTORNEY

United States Patent Office 3,117,308
Patented Jan. 7, 1964

3,117,308
CONTROL SYSTEMS
Ivan H. Sublette, Haddonfield, N.J., assignor to Radio Corporation of America, a corporation of Delaware
Filed July 1, 1957, Ser. No. 669,297
13 Claims. (Cl. 340—174)

This invention relates to control systems, and particularly to feedback control systems.

In certain control systems, for example, sampled data servo systems, the data at one or more points in the system consist of trains of pulses or sequences of numbers. The signals representing the data may be spaced at regular or irregular intervals of time. The input data may be received intermittently, for example, in radar systems and certain communication links. In control systems of the sampled data and of the intermittent type, a special circuit, variously termed a hold circuit, a low-pass filter circuit, a store circuit, or a clamping circuit, may be provided for storing a previously received input signal until the next succeeding input signal is received. Hereinafter, such a special circuit is referred to as a hold circuit.

In certain prior control systems of the type referred to, a linear capacitor is used to provide the storing function of the hold circuit. Such prior circuits have a disadvantage in that an undesired change in the stored signal occurs due to the discharge of the storage capacitor, and particularly so when the interval between successive input signals is relatively long.

It is an object of the present invention to provide improved hold circuits which can be operated to store an input signal for an indefinitely long period of time.

Another object of the present invention is to provide a novel and improved hold circuit which is responsive to either polarity input signals.

Still another object of the invention is to provide improved hold circuits for use in feedback control systems.

According to the present invention, a hold circuit includes a transfluxor capable of being set to any level between a blocked condition and a fully set (that is, fully unblocked) condition. Setting pulses are applied to the transfluxor from a source having a low impedance, i.e., a constant voltage source. Each setting pulse has a volt-second integral related to the information content of an input signal. A corresponding flux change is produced in the transfluxor, which flux change is independent of the previous setting level of the transfluxor. The new setting level of the transfluxor remains unchanged until a new input signal is applied.

Figure 1:
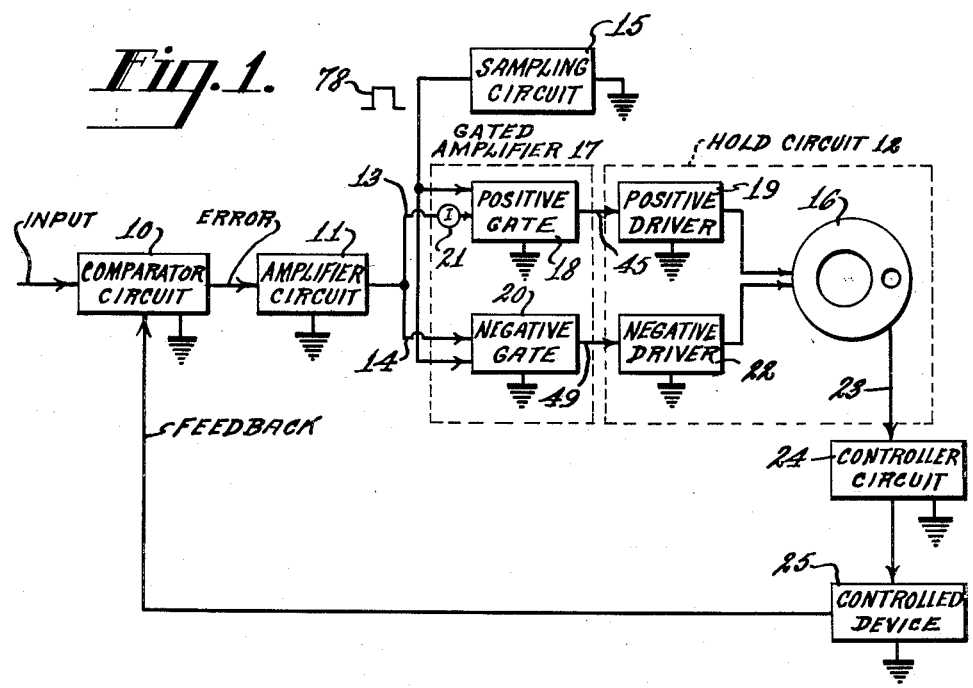
FIG. 1 is a schematic diagram of a control system embodying the invention.

The input signal to which the control system of FIG. 1 responds is applied to one input of a comparator 10. The input signal, for example, may be a continuous, time-varying signal. The comparator 10 compares the input signal with a feedback signal applied to a second of its inputs. Any suitable known comparator unit may be employed. The comparator 10 may include, where necessary, suitable circuits for transforming the feedback signal into the same type of signal as the input signal. The comparator 10 provides an output signal representing the relative difference between the compared signals. The comparator output signal may be a continuous signal of either positive or negative polarity. The output lead of the comparator 10 is connected to an amplifier circuit 11. The output signal of the amplifier 11 is applied to a pair of first inputs of a gated amplifier 17. A sampling circuit 15 applies sampling pulses to another input of the gated amplifier 17. The gated amplifier 17 includes a pair of two-input "and" gates 18 and 20 each having an output coupled to a pair of inputs of a hold circuit 12. The hold circuit 12 includes a positive driver unit 19, a negative driver unit 22, and a transfluxor 16. The output signal of the amplifier 11 is applied respectively to a first input of each of the "and" gates 18 and 20, and the sampling pulses are applied to the second input of each of the "and" gates 18 and 20. The (positive) output of the amplifier is inverted in polarity in an inverter 21, schematically indicated by an "I" in a circle, connected between the output of the amplifier 11 and the first input of the positive "and" gate 18. The output of the positive "and" gate 18 is connected to the input of the positive driver unit 19, and the output of the negative "and" gate 20 is connected to the input of the negative driver unit 21. The outputs of the positive and negative driver units 19 and 22 are coupled to the transfluxor 16. The output of the transfluxor 16 is applied via an output lead 23 to the input of a controller circuit 24 which has an output connected to a controlled device 25. The controlled device 25 includes a means for applying a signal to the feedback input of the comparator 10. This means may provide a voltage proportional to the shaft position in a mechanical positioning system, to frequency in a frequency control system, or the like.

Various circuits are known for each of the components of the control system with the exception of the hold circuit 12.

Figure 2:
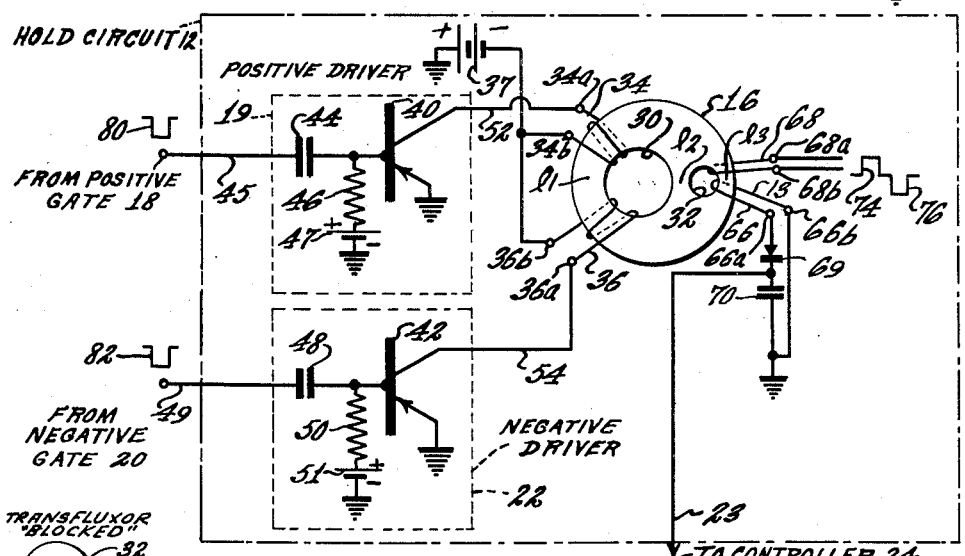
FIG. 2 is a schematic diagram of one embodiment of a hold circuit, according to the invention, using a pair of setting windings for obtaining bidirectional setting of a transfluxor of FIG. 1.

Details of one embodiment of a hold circuit 12 are illustrated in FIG. 2. The transfluxor 16 is similar to the transfluxor of FIG. 3 of an article by J. A. Rajchman and A. W. Lo, entitled "The Transfluxor," published in the Proceedings of the I.R.E., March 1956, pages 321–332. The transfluxor 16 has a magnetic body, or core, with a substantially rectangular hysteresis characteristic. This core has a setting aperture 30 of relatively large diameter, and an output aperture 32 of relatively small diameter. The two apertures of the transfluxor 16 provide three separate legs $l_1$, $l_2$ and $l_3$. The wide leg $l_1$, between the setting aperture 30 and the periphery of the core 16, has a minimum cross-sectional area at least equal to the cross-sectional areas of the sum of the other two legs. The middle leg $l_2$ is located between the setting and the output apertures 30 and 32, and the narrow outside leg $l_3$ is located between the output aperture 32 and the periphery of the magnetic core. The cross-sectional area of the narrow middle leg $l_2$ is made substantially equal to the cross-sectional area of the narrow outside leg $l_3$. First and second setting windings 34 and 36 are each linked to the transfluxor 16 through the setting aperture 30. Beginning at terminals 34a and 36a of the first and second setting windings 34 and 36, respectively, the first setting winding 34 is linked in one sense, and the second setting winding 36 is linked in the opposite sense to the transfluxor 16. The other terminals 34b and 36b of the first and second setting windings 34 and 36 are both connected to the negative output terminal of a constant-voltage source, such as a battery 37, which has its positive terminal connected to a common reference potential, indicated in the drawing by the conventional ground symbol. By constant-voltage source is meant one capable of supplying varying amounts of current without any appreciable change in source voltage, i.e., a source having a relatively low internal impedance.

The first and second setting windings 34 and 36, respectively, are controlled by first and second transistors 40 and 42, indicated in the drawing to be of one conductivity type, for example PNP, each having collector, emitter and base electrodes. The pair of transistors 40 and 42 serve respectively as the positive and negative driver units 19 and 22 of FIG. 1. A lead 52 connects the collector electrode of the first transistor 40 to the terminal 34a of the first setting winding 34, and a lead 54 connects the collector electrode of the second transistor 42 to the terminal 36a of the second setting winding 36. The emitter electrodes of both the first and second transistors 40 and 42 are connected to ground. The base electrode of the first transistor 40 is A.-C. coupled via a capacitor 44 and the input lead 45 to the output of the positive "and" gate 18 of FIG. 1. A bias resistor 46 (FIG. 2) connects the base electrode of the first transistor 40 to the positive terminal of a first source of bias potential, such as a battery 47. The negative terminal of the battery 47 is connected to ground. The base electrode of the second transistor 42 is A.-C. coupled via another capacitor 48 and the input lead 49 to the output of the negative "and" gate 22 of FIG. 1. A bias resistor 50 (FIG. 2) connects the base electrode of the second transistor 42 to the positive terminal of a second bias source such as a battery 51. The negative terminal of the battery 51 is connected to ground. The batteries 47 and 51 may be a single source.

An output winding 66 and an interrogation winding 68 are each linked through the output aperture 32 of the transfluxor 16. One terminal 66a of the output winding 66 is connected in series with a unidirectional conducting device, such as a diode 69, to one plate of an output capacitor 70. The other plate of the capacitor 70 and the other terminal 66b of the output winding 66 are each connected to ground. The output of the hold circuit 12, appearing on the output lead 23, is taken across the output capacitor 70.

Figure 2A:
FIGS. 2a, 2b and 2c are schematic diagrams respectively illustrating flux conditions in the transfluxor of FIG. 2 during various stages of operation.
Figure 2B:

In operation assume, for example, that the transfluxor 16 initially is in its blocked condition. In the blocked condition, the flux in each of the legs $l_1$, $l_2$ and $l_3$ is oriented in the one sense, for example, the clockwise sense, around, or with reference to, the setting aperture 30. The flux condition of the transfluxor 16 when placed in the blocked condition is indicated by the arrows in the respective legs of the diagram of FIG. 2a. Accordingly, a sequence of positive and negative interrogation pulses 74 and 76 (FIG. 2) applied to the interrogation winding 66 does not induce any appreciable voltage in the output winding 66. First, consider the positive interrogation pulse 74 which is in a direction to make the terminal 68a of the interrogation winding 68 positive relative to the terminal 68b. No output voltage is produced in the output winding 66 because the flux in one of the narrow legs, $l_2$ already is saturated in the direction in which the interrogation pulse 74 tends to increase the flux. Next, consider the negative pulse 76. No output voltage is produced because the narrow outside leg $l_3$ already is saturated in the direction in which the interrogation pulse 76 tends to increase flux. Accordingly, a continuous sequence of interrogation pulses 74 and 76 does not produce any charge on the capacitor 70. The blocked condition then corresponds to one extreme setting level of the transfluxor 16 and substantially no output is produced by the hold circuit 12. The other extreme setting level of the transfluxor 16 corresponds to the condition when substantially all the flux in both the narrow legs $l_2$, $l_3$ is oriented in the same sense, for example, clockwise, around or with respect to the output aperture 32 and in opposite senses with respect to the setting aperture 30. The flux condition of the transfluxor 16 when placed in the fully set condition is illustrated in the diagram of FIG. 2b. Note that substantially all the flux in the middle leg is reversed from the initial clockwise sense (FIG. 2a) to the counterclockwise sense, with reference to the larger aperture. Now, when the positive interrogation pulse 74 is applied to the interrogation winding 68 (FIG. 2), the flux in the narrow legs $l_2$, $l_3$ is reversed from the clockwise to the counterclockwise sense around the output aperture 32, and a corresponding voltage is induced in the output winding 66. This induced voltage is in a direction to bias the diode 69 in its non-conducting direction and substantially no current flows in the output winding 66. However, the succeeding, negative interrogation pulse 76 changes the flux in the narrow legs $l_2$, $l_3$ from the counterclockwise to the initial clockwise sense with reference to the output aperture 32, and a corresponding voltage is induced in the output winding 66. This induced voltage is in a direction to make the diode 69 conduct, and a resultant charge flows into the output capacitor 70. Each time a sequence of positive and negative interrogation pulses 74 and 76 is applied to the interrogation winding 68, corresponding output voltages are induced across the output winding 66, and a corresponding charge is produced in the output capacitor 70. Accordingly, the hold circuit 12 now produces an output which corresponds to the other extreme setting level of the transfluxor 16. Note that the output voltage across the capacitor 70 quickly assumes a voltage determined by the setting level of the transfluxor 16 which voltage is maintained substantially constant because of the continuous interrogation of the transfluxor 16. The frequency of application of the interrogation pulses 74 and 76 is relatively high compared to the frequency of application of the sampling pulses, say ten times.

The setting level of the transfluxor 16 can be changed in any desired degree between the two extremes, as described more fully hereinafter. Note also that the storage property of the output capacitor 70 is not utilized in determining the amount of output of the hold circuit 12. The output capacitor 70 is used to represent one mode of obtaining an output signal corresponding to the information set into the hold circuit 12.

The output of the comparator 10 may be considered an error signal. Upon the occurrence of a positive error signal, for example when the input signal to the comparator 10 (FIG. 1) exceeds the feedback signal, an input pulse such as the negative pulse 80 (FIG. 2) is applied via the input lead 45 of the hold circuit 12 to the base electrode of the first transistor 40. Upon the occurrence of a negative error signal, as when the feedback signal to the comparator 10 (FIG. 1) exceeds the input signal, an input pulse such as the negative pulse 82 is applied via the other input lead 49 of the hold circuit 12 to the base electrode of the second transistor 42. In operation, each of the first and second transistors 40 and 42 normally is biased to non-conduction. Accordingly, normally, substantially no current flows in the first and second setting windings 34 and 36.

Figure 2C:
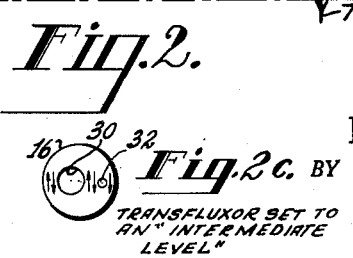

Assume, now, that an input pulse 80, indicating a positive error, is applied to the first transistor 40. An appreciable current flows from ground through the emitter-to-collector path of the first transistor 40, and thence through the first setting winding 34 from the terminal 34a to the terminal 34b, thence to battery 37. The second transistor 42 remains in its fully cut-off condition. The duration of the current flow in the first setting winding 34 is controlled by the duration of the input pulse 80 which is equal to the sampling interval. The total amount of volt-seconds of flux change in the wide leg $l_1$ and the narrow leg $l_2$ of the transfluxor 16 is controlled by the input pulse 80. Upon termination of the input pulse 80, a portion of the flux in the narrow leg $l_2$ is changed to the clockwise sense, with reference to the output aperture 32, unless the transfluxor 16 already is in its fully set condition. If the transfluxor 16 is not fully set, the portion of flux change in its middle leg $l_2$ is in the direction to change the setting level of the transfluxor towards the fully set condition. The flux condition of the transfluxor 16 when set to an intermediate level between the "blocked" and "fully set" conditions is illustrated in the diagram of FIG. 2c. Note that some of the flux in the middle leg is in the initial blocked sense as illustrated by the solid arrow, and some of the middle leg flux is reversed to the opposite sense, as illustrated by the dotted arrow. The amount of flux change in the middle leg $l_2$ represents the information contained in the input pulse 80. Now, when the sequence of interrogation signals 74 and 76 is applied to the interrogation winding 68 (FIG. 2), increased flux changes are produced in the narrow legs $l_2$, $l_3$, due to the increase in the setting level of the transfluxor 16. The increased setting level corresponds to additional flux in the middle leg $l_2$ available for change as described above in connection with FIG. 2c. The increase in flux change is proportional to the additional increment of flux set into the transfluxor 16 by the input signal 80. The flux change in the narrow legs $l_2$, $l_3$ induces a corresponding increased voltage in the output winding 66 to charge the capacitor 70. The output capacitor 70 quickly is charged to an increased voltage due to the repeated application of the interrogation signals. Each time a negative input signal 80 is received, an additional increment of flux, proportional to the duration of the input signal 80, is changed in the wide leg $l_1$ and the narrow leg $l_2$, and the voltage across the capacitor 70 is changed by a corresponding amount. The maximum output signal corresponds to the fully set condition when all the flux in the narrow legs $l_2$ and $l_3$ is changed back and forth by the interrogation signals 74, 76.

Assume, now, that the transfluxor 16 is in its fully set condition, and that an input signal 82 is applied to the second input lead 49. The input signal 82 drives the second transistor 42 from its fully cut-off condition to its fully conducting condition in the saturated region. A resultant current flows from ground through the emitter-to-collector path of the second transistor 42, and through the second setting winding 36, from the terminal 36a to the terminal 36b and the battery 37. The setting current flowing in the second setting winding 36 changes flux in the wide leg $l_1$ and the narrow leg $l_2$ of the transfluxor 16 from the counterclockwise to the initial clockwise sense with reference to the setting aperture 30. Thus, the setting level of the transfluxor is changed from the fully set condition towards the blocked condition. Again, the amount of clockwise flux change in the wide leg $l_1$ and the narrow leg $l_2$ is proportional to the duration of the second input pulse 82. Accordingly, the amount of flux change in the narrow legs $l_2$, $l_3$, produced by the interrogation signals 74 and 76 and, therefore, the output voltage produced in the output winding 66, is correspondingly reduced. The output capacitor 70 then discharges by an amount proportional to the reduction in the output voltage of the transfluxor 16.

Each time a change occurs in the signal received at the input of the control system, the output voltage of the hold circuit is either increased or decreased by a fixed amount. The controller 24 of FIG. 1 responds to the output of the hold circuit 12 in a direction tending to reduce the error signal at the output of the comparator 10 to zero value. Thus, when the input signal to the system and the feedback signal from the controlled circuit are equal, no further flux change is produced in the transfluxor 16 of the hold circuit 12.

Note that the prior setting of the transfluxor 16 does not affect the increment of flux change produced in the transfluxor for a given error signal. The operation of the transfluxor 16 is bidirectional from any given setting level, with the error signal from the comparator 10 essentially controlling the amount and the direction of flux change. Observe that it is not necessary to return the transfluxor 16 to an initial unblocked or blocked condition after each error signal.

Figure 3:
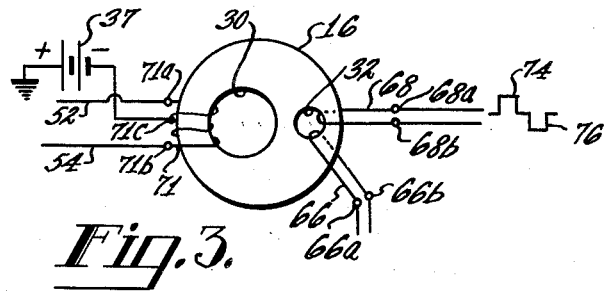
FIG. 3 is a schematic diagram of a modified form of the transfluxor portion of the hold circuit of FIG. 2, using a center-tapped setting winding.

The hold circuit 12 may be modified, as indicated in FIG. 3, to have a single setting winding 71. The remaining elements of the hold circuit 12 are the same as in FIG. 2.

In FIG. 2 the setting winding 71 is center-tapped and has its upper and lower terminals 71a and 71b respectively connected to the collector electrodes of the first and second transistors 40 and 42 of FIG. 2 via the leads 52 and 54. The center terminal 71c is connected to the negative terminal of the battery 37. The upper and lower halves of the setting winding 71 respectively correspond to the first and second setting windings 34 and 36 of FIG. 2.

Figure 4:
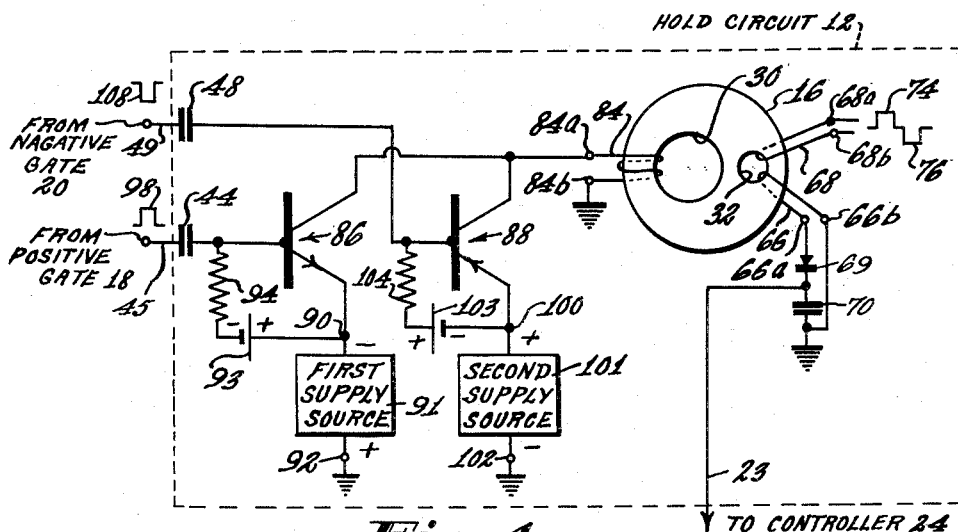
FIG. 4 is another embodiment of a hold circuit, according to the invention, using a single setting winding for obtaining bidirectional setting of a transfluxor.

Referring now to FIG. 4, details of another embodiment of a hold circuit 12 are illustrated. The hold circuit of FIG. 4 includes a transfluxor 16 having only a single two-terminal setting winding 84 linked thereto. Beginning at one terminal 84a, the setting winding 84 is brought across the top surface of the transfluxor 16, then downwardly through the setting aperture 30, then across the bottom surface of the transfluxor 16 to the other terminal 84b. The terminal 84b of the setting winding 84 is connected to ground. The terminal 84a of the setting winding 84 is connected to the collector electrodes of first and second transistors 86 and 88 which are respectively of the NPN and PNP conductivity types. The emitter electrode of the first transistor 86 is connected to the negative terminal 90 of a first supply source 91 of potential $-E_1$ which has its positive terminal 92 connected to ground. The base-to-emitter diode of the first transistor 86 is reverse-biased by a bias battery 93 which has its positive terminal connected to the emitter electrode and its negative terminal connected through a bias resistor 94 to the base electrode of the first transistor 86. The base electrode of the first transistor 86 also is connected via the coupling capacitor 44 to the first input lead 45 which receives positive pulses 98 representing positive error signals. The emitter electrode of the second transistor 88 is connected to the negative terminal 100 of a second supply source 101 of potential $E_1$ which has its positive terminal 102 connected to ground. The emitter-to-base diode of the second transistor 88 is reverse biased by means of a bias battery 103 which has its negative terminal connected to the emitter electrode and its positive terminal connected through a bias resistor 104 to the base electrode of the second transistor 88. The base electrode of the second transistor 88 also is connected via the coupling capacitor 48 to the second input lead 49 which receives negative error pulses 108. The hold circuit 12 of FIG. 4 receives both positive and negative input pulses. The positive "and" gate 18 of FIG. 1 may be modified in any suitable known manner to provide the positive input pulses 98 of FIG. 4. Alternatively, the inverter circuit 21 may be removed from the connection between the amplifier 11 and the "and" gate 18.

In the absence of an error signal 98 or 108, the first and second bias sources 93 and 103 maintain the first and second transistors 86 and 88 cut-off.

Assume, now, that a positive-error signal 98 is applied to the first input lead 45. The positive error signal 98 is of an amplitude sufficient to change the first transistor 86 from its fully cut-off to its fully conducting condition. Accordingly, the voltage $-E_1$ is applied across the setting winding 84 in a direction to cause a current flow therein from the terminal 84b to the terminal 84a. This current flow generates a magnetizing force in a direction tending to produce a counterclockwise flux in the wide leg $l_1$ and the middle leg $l_2$ with respect to the setting aperture 30 of the transfluxor 16. Thus, the setting level of the transfluxor 16 is increased by an amount determined by the input pulse 93. The supply source 91 is preferably a constant voltage source. With such a source the amount of current flow in the setting winding 84 adjusts itself so that the desired increment of flux change is produced in the transfluxor 16 regardless of its previous level of setting.

Similarly, when a negative error signal 108 is received, the second transistor 88 is changed from its fully cut-off to its fully conducting condition. Accordingly, the voltage $E_1$ is applied across the setting winding 84 in a direction to cause a current flow from the terminal 84a to the terminal 84b. This current flow tends to produce a clockwise flux change in the wide leg $l_1$ and the middle leg $l_2$ with reference to the setting aperture 30, thereby decreasing the setting level of the transfluxor 16.

Thus, in the embodiment of FIG. 4 the direction of current flow in the single setting winding 84 is controlled by the error signals 98 and 108. Each time an error signal is received, the setting level of the transfluxor 16 is changed in the proper direction by a given increment. Thus, the output voltage of the hold circuit 12 approaches a level in stepwise fashion until the error signals are reduced to zero.

A single setting winding, arranged as in FIG. 4, provides a more sensitive control of the setting level of the transfluxor of a hold circuit. The following equation may be used to relate the setting voltage, and the resulting flux change in the transfluxor 16:

$$(1) \qquad E = N \frac{\delta \phi}{\delta t}$$

where E is the collector voltage of the transistors, N is the number of turns of the setting winding, and $\phi$ is the flux change produced in the transfluxor. From Equation 1 it can be seen that, that, for a given supply voltage E, the more turns that are used for the setting winding, the finer is the control of the setting level of the transfluxor 16. In using two different windings or one center-tapped setting winding, 2 N turns are required to obtain the same sensitivity of control in the two directions as is obtained by N turns in the circuit of FIG. 4. In practice, the maximum usable N of Equation 1 is limited by the size of the setting aperture. Accordingly, the circuit of FIG. 4 can provide a more sensitive control than the prior circuits.

Figure 5:
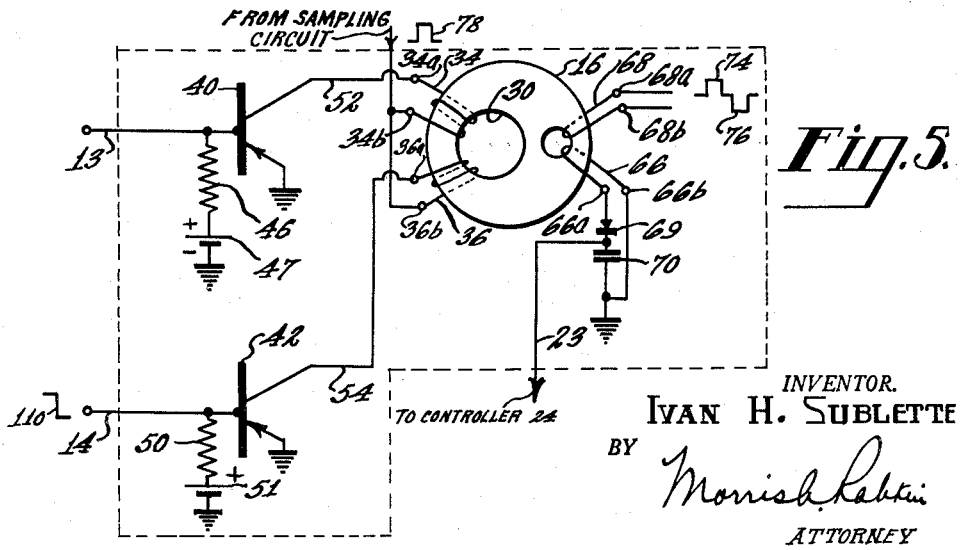
FIG. 5 is a schematic diagram of another embodiment of a hold circuit, according to the invention, having sampling pulses applied to the hold circuit.

The hold circuit of FIG. 5 is arranged similarly to the hold circuit of FIG. 2 except that the sampling pulses are applied to the setting windings 34 and 36, and the error signals are directly coupled to the transistors 40 and 42.

The first transistor 40 of FIG. 5 performs both the functions of the positive "and" gate 18 and the positive driver unit 19 of FIG. 1, and the second transistor 42 performs the functions of the negative "and" gate 20 and the negative driver unit 22 of FIG. 1.

The operation of the first and second transistors 40 and 42 of FIG. 5 are jointly controlled by the sampling pulses 78 and the error signals from the amplifier circuit 11 of FIG. 1. Thus, for example, when a negative error signal is generated by the comparator 10, the negative voltage level appearing on the output lead 14 of the amplifier 11 is applied to the base electrode of the second transistor 42 of FIG. 5. In FIG. 5 the voltage level 110 is used to represent the negative error signal. The negative voltage level 110 primes the second transistor 42 for conduction. Upon the occurrence of a sampling pulse 78, the primed second transistor 42 is changed to its fully conducting condition, and a resultant current flows in the second setting winding 36 to change the setting level of the transistor 16. The remaining operation of the hold circuit 12 is the same as that described for the circuit of FIG. 2.

Similarly, the positive error signal from the amplifier 11 (FIG. 1) is inverted in the inverter 17, and a negative voltage is applied to the base electrode of the first transistor 40 (FIG. 5). The latter negative voltage level (not shown) primes the first transistor 40. During the next succeeding sampling interval, the primed first transistor 40 is made fully conducting to change the setting level of the transfluxor 16.

There have been described herein improved hold circuits for use in control systems of the sampled data or intermittent types. The hold circuits described employ a transfluxor for providing a continuous output in accordance with a previously received error signal. The setting level of the transfluxor can be changed in either direction by a fixed amount, depending upon the direction of the error signals and independent of the prior setting of the transfluxor.

What is claimed is:

1. A hold circuit comprising a transfluxor having a setting aperture and an output aperture and having blocked and fully set conditions and settable at a setting level between said conditions, setting means coupled to said transfluxor through said setting aperture for changing the setting of said transfluxor by a given increment in either direction from said setting level in accordance with an information signal, and means coupled to said transfluxor through said output aperture for obtaining a continuous indication of said changed setting.

2. A hold circuit as claimed in claim 1 wherein said setting means includes separate first and second setting windings.

3. A hold circuit comprising a transfluxor having a setting aperture and an output aperture and having blocked and fully set conditions and settable at a setting level between said conditions, setting means coupled to said transfluxor through said setting aperture, said setting means including means for applying a magnetizing force of either the one or the other polarity to said transfluxor for correspondingly changing the setting of said transfluxor in either the one or the other directions from said setting level, and means coupled to said transfluxor through said output aperture for obtaining a continuous indication of said changed setting.

4. A hold circuit as claimed in claim 3 wherein said setting means includes separate first and second setting windings linked in opposite senses to said transfluxor.

5. A hold circuit as claimed in claim 3 wherein said setting means further includes first and second transistors, each having collector, emitter and base electrodes, a constant voltage source, separate setting windings linked to said transfluxor and respectively connecting said collector electrodes to said constant voltage source, and means for applying selectively a signal to either the one or the other of said base electrodes.

6. In a control system, the combination comprising a transfluxor having a setting aperture and an output aperture, a pair of setting windings linked to said transfluxor in respectively opposite senses through said setting aperture, a gated amplifier circuit including a pair of "and" gate circuits each having a first and second input and an output for driving said pair of setting windings, means for applying error signals of one kind to said first input of one of said "and" gates, and error signals of another kind to said first input of the other of said "and" gates, and means for applying sampling pulses to said second inputs of both said "and" gates, said "and" gate circuits and said setting windings operating to apply magnetizing forces of either the one or the other polarity to said transfluxor for the duration of said sampling pulses to correspondingly increase or decrease the setting of said transfluxor.

7. In a control system, the combination comprising a transfluxor having a setting aperture and an output aperture, setting means coupled to said transfluxor through said setting aperture, a gated amplifier circuit including a pair of "and" gates each having a first and a second input and an output for driving said pair of setting windings, means for applying error signals of one kind to said first input of one of said "and" gates, and error signals of another kind to said first input of the other of said "and" gates, means for applying sampling pulses to said second inputs of both said "and" gates, said "and" gate circuits and said setting windings operating to apply magnetizing forces of either the one or the other polarity to said transfluxor for the duration of said sampling pulses to correspondingly increase or decrease the setting of said transfluxor, and means coupled through the output aperture of said transfluxor for obtaining an indication of said increased or decreased setting.

8. A hold circuit comprising a transfluxor having a setting aperture and an output aperture, a pair of setting windings respectively linked in opposite senses through said setting aperture of said transfluxor, said setting windings having corresponding first terminals and corresponding second terminals, a pair of transistors each having collector, emitter, and base electrodes, said collector electrodes being respectively coupled to said first terminals, said second terminals each being connected to receive sampling pulses, and means for applying a voltage level selectively to either one of said base electrodes.

9. A hold circuit comprising a transfluxor having a setting aperture and an output aperture, first and second setting windings respectively linked in opposite senses through said setting aperture, first and second transistors each having collector, emitter, and base electrodes, said collector electrodes being respectively connected to said first and second setting windings, means for selectively applying a voltage level to one of said base electrodes, and means for simultaneously applying to both said setting windings a sampling pulse, said sampling pulse causing a flux change in the one or the other senses about said setting aperture depending upon which of the transistors receives said voltage level.

10. A hold circuit comprising a transfluxor having a setting aperture and an output aperture, a center-tapped setting winding linked through said setting aperture, said setting winding having end terminals and a center terminal, first and second transistors each having collector, emitter, and base electrodes, said collector electrodes being respectively connected to said end terminals, and a constant voltage source having one terminal connected to said center terminal and another terminal connected to a reference potential, said emitter electrodes being connected to the same reference potential, and means for applying selectively an input signal to the base electrode of one of said transistors.

11. A hold circuit as claimed in claim 10, including an interrogation winding and an output winding each linked through said output aperture of said transfluxor, whereby interrogation pulses applied to said interrogation winding produce an output voltage across said output winding in accordance with the setting of said transfluxor.

12. A hold circuit comprising a transfluxor having a setting aperture and an output aperture, said apertures defining three separate legs in said transfluxor, a first of said legs being located between the periphery of said core and said setting aperture, a second of said legs being located between said setting and output apertures, and a third of said legs being located between said output aperture and the periphery of said transfluxor, the minimum cross-sectional area of said first leg being at least equal to the sum of the cross-sectional areas of said second and third legs, and said second and third legs being of substantially equal cross-sectional area, said transfluxor having blocked and fully set conditions and settable at a setting level between said conditions, setting means coupled to said transfluxor through said setting aperture for changing the setting of said transfluxor by a given increment in either direction from said setting level in accordance with an information signal, and means coupled to said transfluxor through said output aperture for obtaining a continuous indication of said changed setting.

13. A hold circuit comprising a transfluxor having a setting aperture and an output aperture, said apertures defining three legs in said transfluxor, a first of said legs being located between said setting aperture and the periphery of said transfluxor, a second of said legs being located between said setting and output apertures, and a third of said legs being located between said output aperture and the periphery of said transfluxor, the minimum cross-sectional area of said first leg being substantially equal to the sum of the cross-sectional areas of said second and third legs, and said second and third legs being of substantially equal cross-sectional area, said transfluxor having blocked and fully set conditions, and settable at a setting level between said conditions, setting means coupled to said transfluxor through said setting aperture, said setting means including means for applying a magnetizing force of either one or the other polarity to said transfluxor for correspondingly changing the setting of said transfluxor in either the one or the other directions from said setting level, and means coupled to said transfluxor through said output aperture for obtaining a continuous indication of said changed setting.

References Cited in the file of this patent

UNITED STATES PATENTS

| | | |
|---|---|---|
| 2,760,083 | Pittman et al. | Aug. 21, 1956 |
| 2,814,794 | Bauer | Nov. 26, 1957 |
| 2,884,622 | Rajchman | Apr. 28, 1959 |

OTHER REFERENCES

"The Transfluxor—A Magnetic Gate with Stored Variable Setting," by J. A. Rajchman and A. W. Lo, RCA Review, June 1955.